United States Patent [19]
Schmidt et al.

[11] Patent Number: 5,544,948
[45] Date of Patent: Aug. 13, 1996

[54] SERVICE AND EMERGENCY BRAKE SYSTEM HAVING A MASTER CYLINDER WITH A TRAVEL SIMULATOR GAS-FILLED SPRING

[75] Inventors: Guenther Schmidt, Tamm; Klaus Schmidt, Moeglingen, both of Germany

[73] Assignee: Robert Bosch GmbH, Stuttgart, Germany

[21] Appl. No.: 339,726

[22] Filed: Nov. 14, 1994

[30] Foreign Application Priority Data

Dec. 18, 1993 [DE] Germany .......................... 43 43 386.3

[51] Int. Cl.⁶ ................................................. B60T 13/10
[52] U.S. Cl. ........................... 303/122.11; 303/9; 60/550; 60/566
[58] Field of Search ................................ 303/9, 9.61, 92, 303/113.4, DIGS. 1–4, 122.11; 60/565, 566, 582, 550

[56] References Cited

U.S. PATENT DOCUMENTS 4,244,185  1/1981  Belart ........................................ 60/550
4,776,643  10/1988  Leiber ................................ 303/113.4 X

FOREIGN PATENT DOCUMENTS 4029793  3/1992  Germany .

Primary Examiner—Josie Ballato
Attorney, Agent, or Firm—Edwin E. Greigg; Ronald E. Greigg

[57] ABSTRACT

A travel simulator having a progressive pedal characteristic to be in operation in a power-actuated service brake. The hydraulic brake system has a valve assembly for the switching of the brake system into operation as either a service brake or as an emergency brake. The master cylinder has a pressure fluid reservoir, two pressure chambers, and an intermediate piston as well. The intermediate piston is supported on a travel simulator spring. When the service brake is in operation, pressure fluid can be diverted from the second pressure chamber into the reservoir, and the intermediate piston is moved against the resistance of the spring. When the emergency brake is in operation, both pressure chambers communicate with one another so that the intermediate piston is pressure balanced. When the pedal is actuated, pressure fluid is expelled from the first pressure chamber. The intermediate piston is not subject to any motion during an emergency brake operation. The brake system is for use in road vehicles.

4 Claims, 2 Drawing Sheets

SERVICE AND EMERGENCY BRAKE SYSTEM HAVING A MASTER CYLINDER WITH A TRAVEL SIMULATOR GAS-FILLED SPRING

BACKGROUND OF THE INVENTION

The invention is based on a hydraulic brake system for road vehicles.

German Patent 40 29 793 A1 makes known a brake system of this kind, in which at the start of braking, the first stop valve in the brake circuit remains in the open position, so that by means of actuating the brake pedal, pressure fluid is displaced from the pressure chamber of the master cylinder, and brake pressure is increased in the wheel brake cylinder. The brake pedal executes a deflection, which is predominantly determined by the air play in the wheel brake, as well as by the elasticity of the wheel brake and the brake line. However, the generally desired progressive pedal characteristic, i.e. the resistance that at the onset of pedal travel is slight and progressively increases with greater deflection, is unsteady in the known brake system, in that from a predetermined pressure threshold, the first stop valve is switched to the closed position and the power actuation of the service brake is activated. As the load exerted by the driver increases, the brake pedal has no further significant travel. It is, however, desirable for approximately the same pedal characteristic to prevail, both upon actuation of the service brake as well as upon actuation of the emergency brake.

OBJECT AND SUMMARY OF THE INVENTION

The brake system according to the invention has an advantage over the prior art that the spring influences the pedal characteristic upon operation of the brake system as a power-actuated service brake; over the entire range of action, steady pedal travel and a progression of the spring tension is produced without abrupt changes in force. While the pressure fluid from the second pressure chamber of the master cylinder is displaced into the pressure fluid reservoir, the first pressure chamber remains separated from the brake circuit by means of the first stop valve so that an inadmissibly great increase in the pedal travel is avoided. When the brake is released, the energy absorbed by the spring is taken completely off the brake pedal.

In comparison, if the emergency brake is activated due to a failure of the service brake, both pressure chambers of the master cylinder communicate with each other by means of the third and fourth line and the intermediate piston is pressure balanced, i. e. upon an actuation of the brake pedal, the intermediate piston maintains its starting position and pressure fluid is displaced only from the pressure chamber on the pedal side. Doing this, the pedal characteristic is not influenced by means of the spring so that an undesired increase in pedal travel does not occur. This is why the available pedal travel can be used entirely for displacing pressure fluid from the pressure chamber on the pedal side. This allows one to advantageously keep the diameter of the master cylinder small and, because of the thus reduced actuation forces, to reduce the diameter of a vacuum brake booster if one is necessary, or to do without it altogether.

With the embodiment of a spring set forth herein, a pedal characteristic can be achieved in a simple, cost-effective manner; this pedal characteristic can be varied widely by varying both the properties of the elastomer and the contribution and size of the cells.

The improvement of the invention distinguishes itself in that the installation chamber of the master cylinder provided for the spring can be used entirely.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
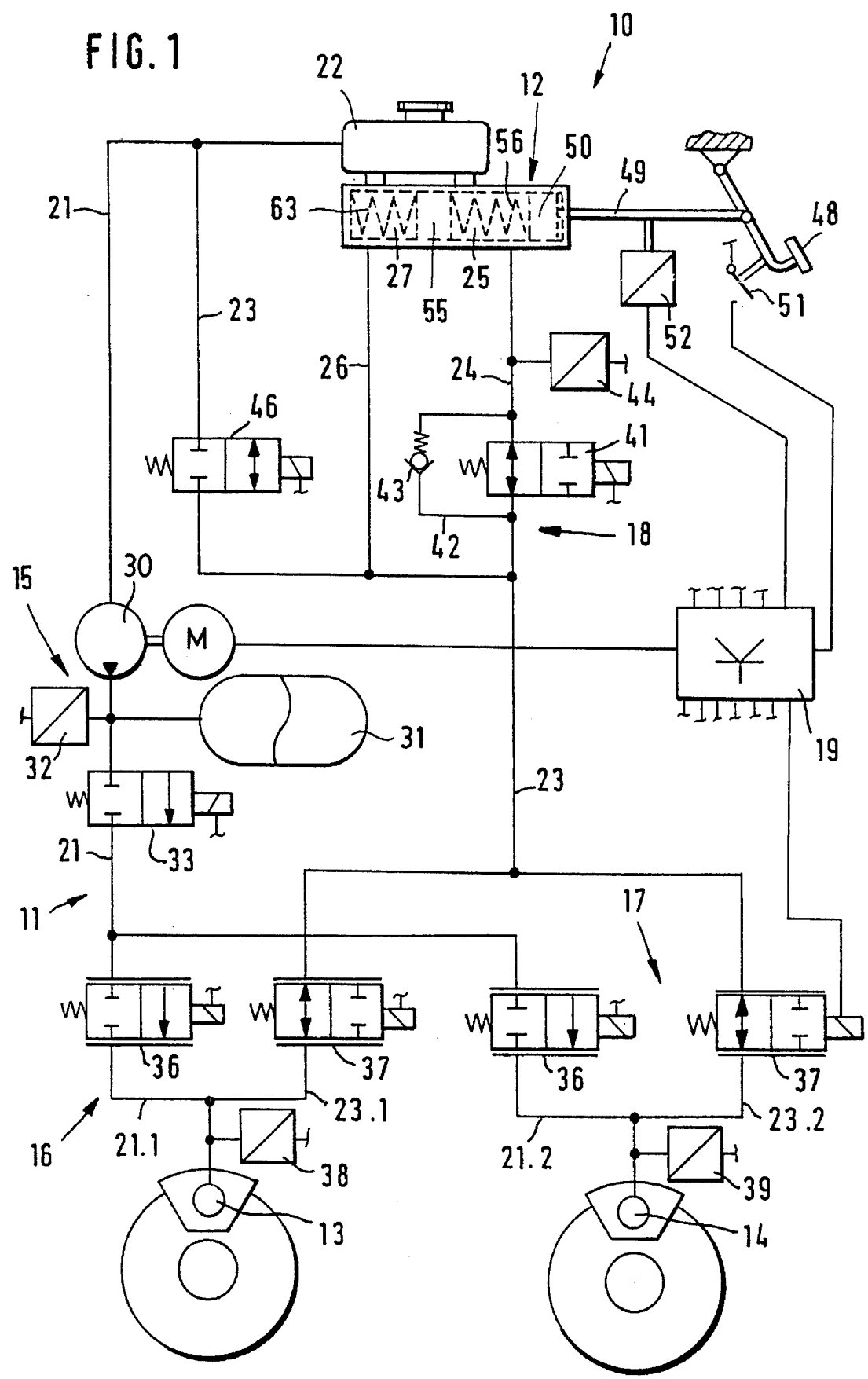
FIG. 1 shows fluid flow lines and a wiring diagram of a hydraulic brake system.

FIG. 1 indicates a hydraulic brake system 10, of which merely one brake circuit 11 is shown, which serves both as an externally actuated service brake and as manually-actuated emergency brake for a street vehicle, particularly a passenger vehicle. Essential elements of the brake system 10 are a pedal actuatable master cylinder 12, wheel brakes 13 and 14 of the brake circuit 11, a servo pressure source 15, valve assemblies 16 and 17 for pressure modulation in the wheel brake cylinders 13 and 14, a valve assembly 18 for reversing the manner of function of the brake system as service brake or emergency brake, and an electronic control unit 19. Throughout this disclosure the term "service brake" relates to a normal operation of the brake system by operation of the brake pedal and of the servo pressure source to control the braking. The term "manually-actuated emergency brake" is an operation of the brake system by movement of the brake pedal in the event the service brake system fails.

The brake system 10 has a first line 21, which leads from a pressure fluid reservoir 22 of the master cylinder 12 and which branches into two line branches 21.1 and 21.2, which lead to the wheel brake cylinders 13 and 14. A second line 23, leading from these brake cylinders 13 and 14 via line branches 23.1 and 23.2, likewise communicates with the pressure fluid reservoir 22. A third line 24 extends between a first pressure chamber 25 of the master cylinder 12 and the second line 23. A fourth line 26 is additionally provided, which extends between a second pressure chamber 27 of the master cylinder 12 and the second line 23.

A high pressure pump 30 of the servo pressure source 15 is disposed in the first line 21 and operated by a motor which is controlled by the electronic control unit 19. Pressure fluid can be sucked out of the pressure fluid reservoir 22 of the master cylinder 12 by means of the high pressure pump 30 and can be fed at a high pressure level into a pressure reservoir 31 connected to the first line 21 downstream of the pump. A pressure sensor 32 is provided connected to the first line 21 to monitor the pressure in the pressure reservoir 31. Downstream of the high pressure pump 30 and the pressure reservoir 31, a pressure holding valve 33 is disposed in the first line 21 in the form of a 2/2-way valve, having a spring-actuated closed position and an electromagnetically switchable open position.

The valve assembly 16 is comprised of an inlet valve 36 disposed in the line branch 21.1 of the line 21 and an outlet valve 37 disposed in the line branch 23.1 of the second line 23. The inlet valve 36 and the outlet valve 37 are embodied as throttling directional control valves with two connection openings. In its one outer end position, the inlet valve 36 assumes a spring-actuated closed position and in its other outer end position, assumes an electromagnetically switchable open position. As its outer end position, the outlet valve 37 has a spring-actuated open position and an electromagnetically switchable closed position. The valve assembly 17 associated with the brake cylinder 14 has the same valve construction. On the brake cylinder side, a pressure sensor 38 and 39 is additionally provided to monitor the pressure in each of the brake cylinders 13 or 14.

The brake cylinders 13 and 14 disposed in the brake circuit 11 are associated with wheel brakes of the front axle of the road vehicle, which are not shown. A second brake circuit which includes the wheel brakes of the rear axle of the vehicle is not shown in FIG. 1. It can be connected on the one end to the servo pressure source 15 and on the other side with the pressure fluid reservoir 22 of the master cylinder 12 and can include valve assemblies for pressure modulation in the wheel brakes of the rear axle.

A first stop valve 41 is disposed in the third line 24 of the brake system in the structural shape of the 2/2-way valve, having a spring-actuated open position and an electromagnetically actuated closed position. The first stop valve 41 is circumvented by a bypass line 42 having a check valve 43 disposed in it, which opens in the direction from the wheel brake cylinders 13, 14 to the master cylinder 12. In the third line 24, also on the master cylinder side, a pressure sensor 44 is connected for accepting the pressure generated in the first pressure chamber 25 of the master cylinder 12.

A second stop valve 46 is disposed in the second line 23 between the pressure fluid reservoir 22 and the connection of the third line 24 to the second line 23. The second stop valve 46, just as the first stop valve 41, is a 2/2-way valve, but has a spring-actuated closed position and an electromagnetically actuated open position. The fourth line 26, which leads from the second pressure chamber 27 of the master cylinder 12 is connected to the second line 23 between the first stop valve 41 and the second stop valve 46.

Figure 2:
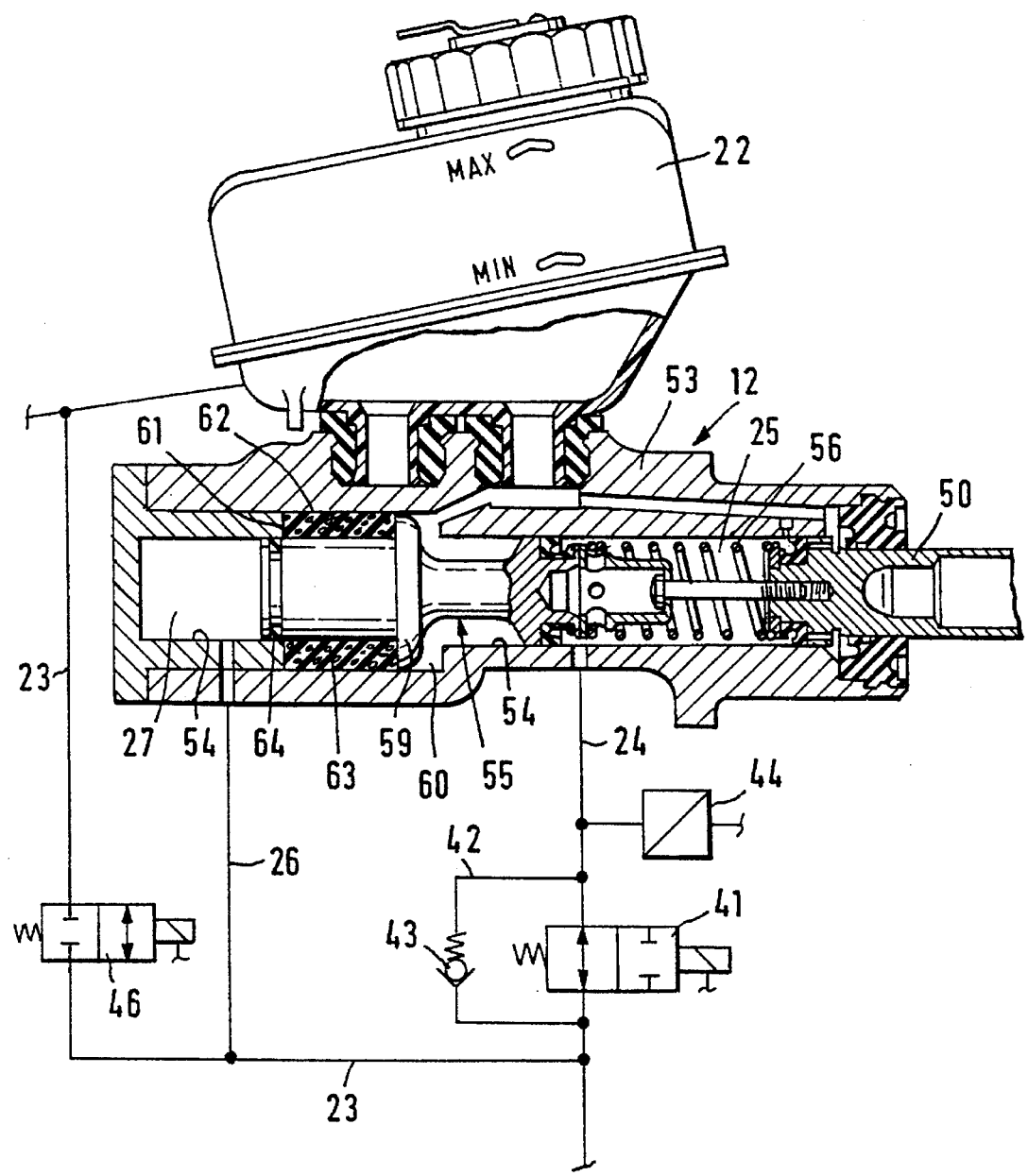
FIG. 2 shows a longitudinal section through a master cylinder disposed in the brake system.

The master cylinder 12 can be actuated by means of a brake pedal 48. This acts, by means of an actuating rod 49, upon a piston 50, which defines the first pressure chamber 25 on the pedal side. By means of actuating the brake pedal 48, a brake light switch can be closed while the motion of the actuating rod 49 can be picked up by a travel sensor 52. As can be seen in the enlarged longitudinal section through the housing 53 of the master cylinder 12 shown in FIG. 2, an intermediate piston 55, which separates the two pressure chambers 25 and 27, is disposed in a cylinder bore 54, which is closed by means of the piston 50. This intermediate piston 55 is coupled in a known manner to the piston 50 so that it can slide longitudinally; when the brake pedal 48 is not actuated, a pressure spring 56 received in and held in place by the pressure chamber 25 keeps both pistons 50 and 55 at a predetermined distance from each other.

Roughly in the middle of its longitudinal span, the intermediate piston 55 is provided with a collar 59, which almost reaches the inner circumference of a diametrical widening 60 of the cylinder bore 54. The diametrical widening 60 is defined against the second pressure chamber 27 by means of a bore step 61. The intermediate piston 55 and its collar 59 on the one side encompass the diametrical widening 60 of the cylinder bore 54 and the bore step 61 as well as on the other side encompassing an annular chamber 62, in which a spring 63 is received. This spring has the shape of a straight, hollow, circular cylinder and fills the annular chamber 62 completely. The spring 63 encompasses the intermediate piston 55 coaxially and is supported on the one side by the piston 55 and on the other side by the master cylinder housing 53. The spring 63 is comprised of an elastomer such as polyurethane, and is embodied having closed-pored, gas-filled cells, preferably microcells. The spring 63 determines the pedal characteristic in operation of the brake system 10 as a service brake. Finally, the intermediate piston 55 is further sealed against the second pressure chamber 27 by means of a seal 64.

The pump 30, the valves 33, 36, 37, 41, 46, the sensors 32, 38, 39, 44, 52, and the brake light switch 51 communicate electrically with the control unit 19. It analyzes the signals of the switch and of the sensors and switches or controls the pump and the valves according to a predetermined algorithm.

The hydraulic brake system 10 functions as follows:

When the service brake is in operation, the pressure reservoir 31 is loaded by operation of the pump 30 and the valves of the servo pressure source 15, of the valve assemblies 16, 17, and 18 assume the indicated position. By means of actuating the brake pedal 48, the brake light switch 51 is closed so that the control unit 19 recognizes the desire to brake. The control unit 19 switches the first stop valve 41 into the closed position and the second stop valve 46 into the open position. The control unit 19 also transfers the outlet valves 37 of the valve assemblies 16 and 17 into the closed position. The pressing down of the brake pedal 48 is monitored by means of the travel sensor 52. The actuating rod 49 effects a shift of the piston 50, which, due to the closed stop valve 41 and the stopping check valve 43, is transferred to the intermediate piston 55 by the hydraulic column in the pressure chamber 25. This displaces pressure fluid from the second pressure chamber 27 by means of the open second stop valve 46 into the pressure fluid reservoir 22. At the same time the travel simulator spring 63 is compressed by the intermediate piston 55, which leads to an increase of the pressure in the first pressure chamber 25. This pressure is captured by the pressure sensor 44 and is changed by the control unit 19 into switching signals or control signals for the pressure holding valve 33 as well as the inlet valves 36 of the valve assemblies 16 and 17. According to the signal of the pressure sensor 44, brake pressure is built up in the wheel brake cylinders 13 and 14 of the brake circuit 11 and is monitored by the pressure sensors 38 and 39. If the pressure in the first pressure chamber 25 is reduced, the control unit 19 diverts pressure fluid from the brake cylinders 13 and 14 into the pressure fluid reservoir 22 by means of the outlet valves 37. The second brake circuit of the brake system 10 is not shown, but its brakes are actuated in the same manner.

In the previously described manner of function of the brake system 10 as a service brake, the travel simulator spring 63 determines the pedal characteristic because the pressure fluid enclosed in the first pressure chamber 25 is incompressible and therefore the pressure spring 56 is not stressed and furthermore because the pressure fluid can be displaced from the second pressure chamber 27 by means of the intermediate piston 55 without resistance of any consequence. The spring 63 enclosed in the annular chamber 62 opposes the intermediate piston 55 with a resistance, which is due on the one hand to the deforming of the elastomer frame and is due on the other hand to the compression of the gas in the cells. By means of this, a progressively increasing movement of the actuation force with increasing actuation travel ensues. When the brake pedal 48 is relieved, the energy stored in the spring 63 is given up completely, and the spring assumes its original volume once again. The pressure fluid displaced from the pressure chamber 27 is replaced from the reservoir 22.

If the service brake fails, the valves of the brake system 10 remain in the indicated position and the emergency brake is operational. The servo pressure source 15 cannot inject any pressure fluid into the brake cylinder 13 and 14. Instead, pressure fluid is expelled from the first pressure chamber 25 of the master cylinder 12 by means of the actuation of the brake pedal 48. By means of the open first stop valve 41 and the open outlet valves 37 of the valve assemblies 16 and 17, partial quantities of pressure fluid from the second line 23 reach the brake cylinder 13 and 14, where they cause brake pressure to become operative. The pressure created in the first pressure chamber 25 is also transmitted into the second pressure chamber 27 by means of the fourth line 26. Since a uniformity of pressure consequently prevails on both diametrically equal face ends of the intermediate piston 55, this does not lead to any movement. Thus, pressure fluid is merely displaced from the first pressure chamber 25. Upon operation of the emergency brake, the pedal characteristic is determined on the one hand by means of the stressing of the pressure spring 56 and on the other hand by means of the counterforce with which the brake circuit 11 opposes the pedal force. Also in this connection a progressiveness is given to the increase in force over the pedal travel.

In the above described exemplary embodiment, this emergency brake acts only on the brake circuit 11 associated with the front axle of the vehicle. With safe operation, this is sufficient to transport the vehicle to a workshop for overhauling the brake system in the event of a failure of the service brake.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A hydraulic brake system (10) for road vehicles, having a power-actuated service brake actuated by an engaging brake pedal (48) and an emergency brake actuated manually by engagement of said brake pedal during a failure of said power-actuated service brake, a master cylinder (12) including a housing (53), said master cylinder is actuated with the brake pedal (48) and which has a pressure fluid reservoir (22) and an intermediate piston (55) which is moved against a spring (63), a first line (21) of a brake circuit (11) which leads from the pressure fluid reservoir (22) to at least one wheel brake cylinder (13), a servo pressure source (15) is connected to said first line, a second line (23) which connects at least one wheel brake cylinder (13) of the brake circuit (11) to the pressure fluid reservoir (22), a valve assembly (16) for modulating the pressure in at least one wheel brake cylinder (13), comprising an inlet valve (36) in the first line (21) and an outlet valve (37) in the second line (23), a third line (24), which leads from a first pressure chamber (25) of the master cylinder (12) on a pedal side of said master cylinder and is attached to the brake circuit (11), an electromagnetically actuated first stop valve (41) is disposed in said third line (24), which in an absence of current assumes an open position, the spring (63) cooperates with the intermediate piston (55) and is embodied as a travel simulator spring which determines a pedal force characteristic, the third line (24) is connected to the second line (23) between the master cylinder (12) and the outlet valve (37) of the valve assembly, said outlet valve (37) assumes an open position in an absence of current, an electromagnetically actuated second stop valve (46), which assumes a closed position in an absence of current, said second stop valve is disposed in the second line (23) between the connection of the third line (24) and the pressure fluid reservoir (22), a fourth line (26) is connected to the second line (23) of the brake circuit (11) between the first stop valve (41) and the second stop valve (46), said fourth line (26) leads from a second pressure chamber (27) of the master cylinder (12) remote from the pedal, when the service brake is in operation, the first stop valve (41) assumes an electromagnetically actuated closed position and the second stop valve (46) assumes an electromagnetically actuated open position, and when the emergency brake is in operation, both stop valves (41, 46) remain in the positions they assume in the absence of current.

2. The hydraulic brake system according to claim 1, in which the spring (63) is embodied as a hollow, cylindrical body made of an elastomer that has closed pore, gas-filled cells, said hollow, cylindrical body encompasses the intermediate piston (55) coaxially and is supported between said intermediate piston and an inner surface wall of said master cylinder housing (53).

3. The hydraulic brake system according to claim 2, in which the spring (63) is supported with one face end on a collar (59) of the intermediate piston (55) and another face end on a bore step (61) of the master cylinder housing (53) and fills an annular chamber (62) between the intermediate piston (55) and the master cylinder housing (53).

4. The hydraulic brake system according to claim 2, in which the spring (63) is made of polyurethane.

\* \* \* \* \*